(12) United States Patent
Singh et al.

(10) Patent No.: US 8,928,624 B2
(45) Date of Patent: Jan. 6, 2015

(54) DIFFERENTIAL SENSING FOR CAPACITIVE TOUCH SENSORS

(75) Inventors: Tajeshwar Singh, Trondheim (NO); Terje Saether, Trondheim (NO)

(73) Assignee: Atmel Corporation, San Jose, CA (US)

( * ) Notice: Subject to any disclaimer, the term of this patent is extended or adjusted under 35 U.S.C. 154(b) by 153 days.

(21) Appl. No.: 13/614,875

(22) Filed: Sep. 13, 2012

(65) Prior Publication Data

US 2014/0071082 A1 Mar. 13, 2014

(51) Int. Cl.
*G06F 3/045* (2006.01)

(52) U.S. Cl.
USPC ........................................ 345/174; 178/18.06

(58) Field of Classification Search
CPC ....... G06F 3/044; G06F 3/045; G06F 3/0412; G06F 3/0416; G06F 3/046
USPC ........................................ 345/174; 178/18.06
See application file for complete search history.

(56) References Cited

U.S. PATENT DOCUMENTS

| | | | |
|---|---|---|---|
| 7,663,607 B2 | 2/2010 | Hotelling | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 2009/0315854 A1 | 12/2009 | Matsuo | |
| 2010/0097345 A1* | 4/2010 | Jang et al. | 345/174 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |

FOREIGN PATENT DOCUMENTS

WO WO 2012/129247 9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Kevin M Nguyen
(74) *Attorney, Agent, or Firm* — Baker Botts LLP

(57) ABSTRACT

A first signal from a first sense line of a touch sensor is received. A second signal from a second of the touch sensor is received. The first signal is inverted. The inverted first signal and the second signal are summed to produce a differential signal. The differential signal is output to a touch sensor controller.

19 Claims, 4 Drawing Sheets

DIFFERENTIAL SENSING FOR CAPACITIVE TOUCH SENSORS

TECHNICAL FIELD

This disclosure relates generally to touch screen technology.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

In particular embodiments of a touch sensor, the touch sensor may be configured to determine a location of a touch and/or the proximity of an object using differential measurements. Drive lines of the touch tensor may be pulsed. Sense lines may be configured to take differential measurements of the resulting charge on the sense lines. For example, a first sense line may subtract the charge sensed by the first sense line from the charge sensed by a second sense line. A touch-sensor controller may determine a location of a touch and/or the proximity of an object using the differential measurements.

Using differential measurements in a touch-sensor may result in various technical advantages. One technical advantage may be the ability to provide a touch sensor that is capable of detecting the location of a touch object using differential measurements. As another example, the ability to obtain differential measurements on one or more sense lines of the touch sensor may result in reduced requirements for processing and/or conditioning signals received from the sense lines as compared to taking single-ended measurements on each sense line. Differential measurements may also provide an improved signal to noise ratio. For example, differential measurements may cancel all or a substantial portion of display noise generated at or near the touch sensor. Additionally or alternatively, touch sensor may be optimized for power and/or area due to attenuated common-mode levels achieved using differential methodology. Embodiments of the present disclosure may include all, some, or none of the above benefits.

Figure 1:
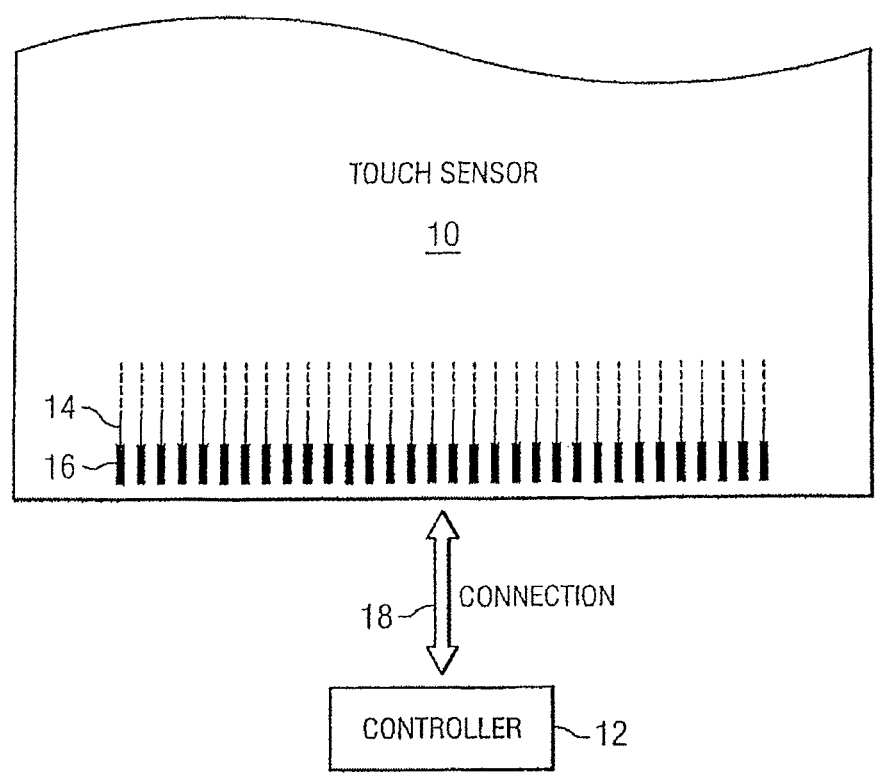
FIG. 1 illustrates an example touch sensor.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, in particular embodiments. Similarly, reference to a touch-sensor controller may encompass both the touch-sensor controller and its touch sensor, in particular embodiments. Touch sensor 10 may include one or more touch-sensitive areas, in particular embodiments. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, in particular embodiments. Alternatively, in particular embodiments, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), in particular embodiments. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material; and the fine lines of conductive material may occupy approximately 5% of the area of its shape in a hatched, mesh, or other suitable pattern. Herein, reference to FLM may encompass such material, in particular embodiments. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

In particular embodiments, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, in particular embodiments, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, in particular embodiments.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, in particular embodiments. Similarly, reference to a sense line may encompass one or more sense electrodes making up the sense line, and vice versa, in particular embodiments.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, in particular embodiments. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, in particular embodiments. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Touch sensor 10 may interact with a touch object such as an active stylus in any suitable manner. A particular active stylus may be configured to cause a change in capacitance at a capacitive node of touch sensor 10. The change in capacitance induced by the active stylus may mimic a touch by, for example, a human finger. Accordingly, when the processor causes the drive unit to supply drive signals to the one or more of the drive electrodes, an active stylus may detect the pulse and respond by injecting a charge at a capacitive node in proximity to the active stylus. The touch-sensor controller 12 may measure the change in capacitance to detect and/or track the location of the active stylus.

Figure 2:
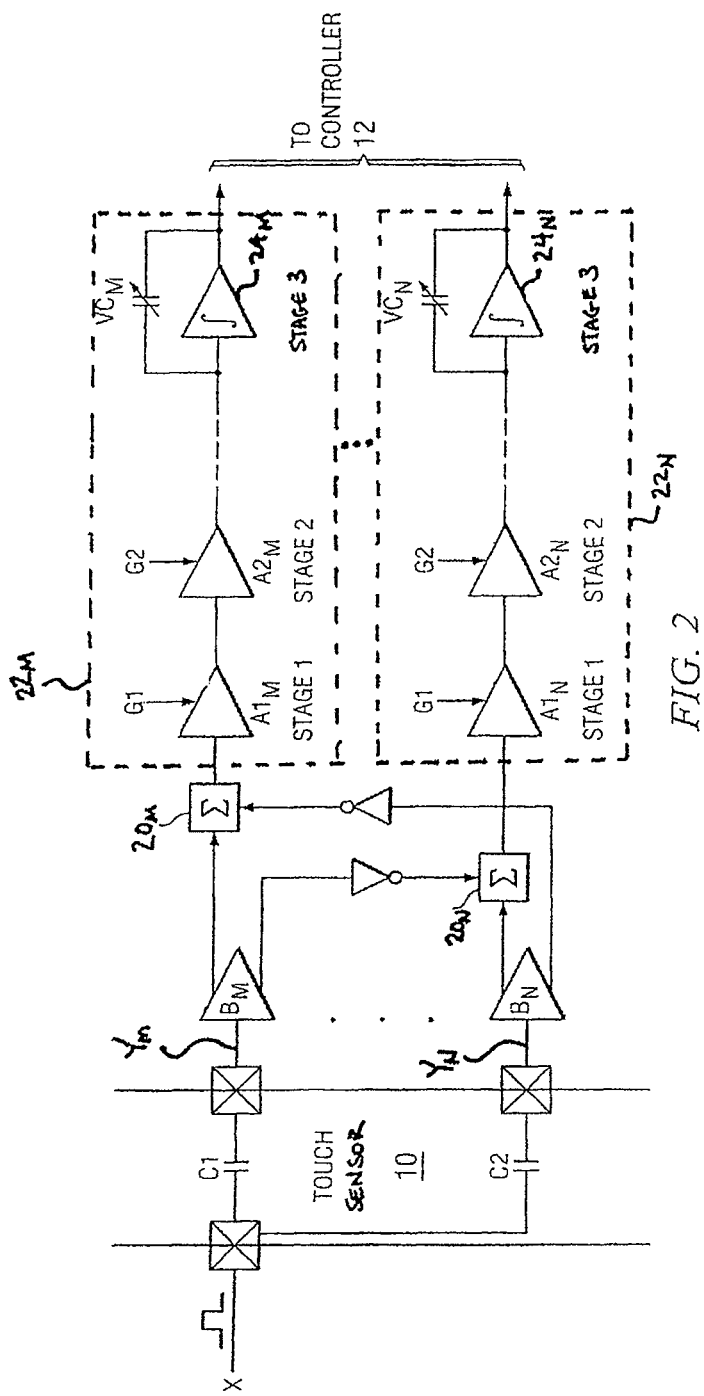
FIG. 2 illustrates an example circuit for differential sensing for capacitive touch sensors.

FIG. 2 illustrates an example touch sensor 10 that uses differential sensing. Touch sensor 10 may include any appropriate number and combination of drive lines and sense lines coupled for differential measurements. For ease of illustration, however, FIG. 2 illustrates the architecture of any two sense lines in touch sensor 10. Touch sensor 10 is depicted as including a drive line X and two sense lines $Y_M$ and $Y_N$ that are coupled for differential measurements. $Y_M$ includes a buffer amplifier $B_M$, a summing circuit $20_M$, and a signal processing circuit $22_M$. Similarly, $Y_N$ includes a buffer $B_N$, a summing circuit $20_N$, and a signal processing circuit $22_N$. When a pulse or alternating charge is driven on the X drive line, a differential capacitance may be measured between the $Y_M$ and $Y_N$ sense lines. For example, $Y_M$ may be capacitively coupled to the X line to form a capacitive node having a capacitance $C_1$ and $Y_N$ may be capacitively coupled to the X line to form a capacitive node having a capacitance $C_2$. $Y_N$ may be utilized to measure a differential capacitance substantively equal to $C_1-C_2$, while $Y_M$ may be utilized to measure a differential capacitance substantively equally to $C_2-C_1$. Based on the differential capacitance on each sense line, the touch-sensor controller 12 may determine a location of a touch object proximate to touch sensor 10.

Sense lines $Y_M$ and $Y_N$ represent any appropriate two sense lines of touch sensor 10. As illustrated, sense lines sense lines $Y_M$ and $Y_N$ are coupled such that each senses a differential measurement of the capacitive nodes formed between $Y_M$ and X and $Y_N$ and X. Sense lines $Y_M$ and $Y_N$ may be configured such that the differential measurement sensed by each line cancels out a common mode signal on the sense lines. For example, the differential measurement may cancel display noise or other interference that is common to the two lines. In addition, the lines may remove an overload current from the lines and/or remove a common mode signals of the respective capacitive nodes. Thus, sense lines $Y_M$ and $Y_N$, when measured differentially, may provide a signal representative of the change in charge less the common mode signals on the sense lines. In some embodiments, the constant portion of the signal received on sense lines $Y_M$ and $Y_N$ may be removed by sensing differentially. Accordingly, sense lines $Y_M$ and $Y_N$ may be spaced apart on touch sensor 10 such that a single touch object is unlikely to touch both sense lines at the same time. In such embodiments, if a touch object is proximate to $Y_M$, the difference between sense lines $Y_M$ and $Y_N$ may represent the charge of the touch object at $Y_M$ less the common mode charge on $Y_N$. In some embodiments, sense lines $Y_M$ and $Y_N$ may be separated by several other sense lines. Alternatively or in addition, substantially all the sense lines in touch sensor 10 may be coupled to another sense line for differential measurements.

Sense line $Y_M$ may be connected to a buffer amplifier $B_M$ that may have two outputs. One of the outputs may be connected to summation circuit 20$_M$. The output of summation circuit 20$_M$ may be connected to signal processing circuit 22$_M$. Another output of buffer amplifier $B_M$ may be connected by an inverter to an input of summation circuit 20$_N$. The output of signal processing circuit 22$_M$ may be transmitted to a sense line input of touch-sensor controller 12.

Sense line $Y_N$ may be connected to a buffer amplifier $B_N$ that may have two outputs. One of the outputs may be connected to summation circuit 20$_N$. The output of summation circuit 20$_N$ may be connected to signal processing circuit 22$_N$. Another output of buffer amplifier $B_N$ may be connected by an inverter to an input of summation circuit 20$_M$. The output of signal processing circuit 22$_N$ may be transmitted to a sense line input of controller 12.

Buffer amplifiers $B_M$ and $B_N$ include any appropriate combination of components, amplifiers, and/or circuitry operable to amplify and/or buffer a signal measured respectively from sense lines $Y_M$ and $Y_N$. It should be noted that while $B_M$ and $B_N$ are depicted as being connected to external inverters, the buffer amplifiers themselves may be designed to invert one or more of the outputs of the buffer amplifier. Buffers $B_M$ and $B_N$ may amplify the signals received on sense lines $Y_M$ and $Y_N$ by a gain in an amount appropriate for transmission to signal processing circuits 22$_M$ and 22$_N$. It should be noted, however, that while buffer amplifiers $B_M$ and $B_N$ are illustrated, any appropriate component may be configured to perform the operation of buffer amplifiers, including amplifiers A1 or A2, discussed in more detail below.

Summation circuits 20$_M$ and 20$_N$ represent any appropriate combination of components, amplifiers, and/or circuitry operable to output a sum of two input signals. For example, summation circuits 20 may represent one or more summation amplifiers. Summation circuits 20 may include one or more operational amplifiers. As another example, summation circuits 20 may represent nodes that output a sum of two currents. In some embodiments, summation circuit 20 represents a circuit that subtracts its two input values. In such embodiments, inverters may be omitted.

Signal processing circuits 22$_M$ and 22$_N$ represent any appropriate combination of components, amplifiers, and/or circuitry to process the signal measured by buffer BM to an appropriate form expected by touch-sensor controller 12. As illustrated, signal conditioning circuit 22$_M$ includes three stages. Stage 1 includes an amplifier A1$_M$. Stage 2 includes an amplifier A2$_M$. Stage 3 includes an integrating circuit 24$_M$ and variable capacitor VC$_M$. Similarly, signal conditioning circuit 22$_N$ includes three stages. Stage 1 includes an amplifier A1$_N$. Stage 2 includes an amplifier A2$_N$. Stage 3 includes an integrating circuit 24$_N$ and variable capacitor VC$_N$.

Amplifiers A1 and A2 may be programmable gain amplifiers operable to scale the input signal by a programmable gain, respectively shown as G1 and G2. Stage 1 amplifiers A1 may be designed to prescale the signal received from summing circuits 20. For example, in an embodiment where touch sensor 10 is designed to accommodate high voltages, stage 1 amplifiers A1 may prescale the input signal by a programmable factor G1. G1 may, for instance, be 1/2, 1/4, 1/8, or some other appropriate scaling factor. Amplifiers A2 may be logarithmic amplifiers operable to output a signal proportional by a programmable factor G2 to the natural log of the input signal. Amplifiers A2 may be designed to output values in two or more steps between logarithmic steps. Integrating circuits 24 may be integrators that collect charge from sense lines. Integrating circuits 24 may be programmable by VC$_N$ to track the capacitance of touch sensor 10. The capacitance of touch sensor 10 may, for example, depend on the size, shape, and, or other characteristics of touch sensor 10. VC$_N$ may be programmed to match the capacitance of touch sensor 10. Integrating circuits 24 may be designed to track touch sensor 10 capacitances in logarithmic steps according to the output of amplifiers A2.

In operation, touch-sensor controller 12 determines locations of touch objects proximate to touch sensor 10 using differential measurements on the sense lines of touch sensor 10, including sense lines $Y_M$ and $Y_N$. Touch-sensor controller 12 may transmit a drive signal on the X line according to the manner described above with respect to FIG. 1. On sense line $Y_M$, buffer amplifier $B_M$ may sense and/or measure capacitance $C_1$ representing the capacitance of the capacitive node formed by X and $Y_M$. On sense line $Y_N$, buffer amplifier $B_N$ may sense and/or measure capacitance $C_2$ representing the capacitance of the capacitive node formed by X and $Y_N$. Buffer amplifier $B_M$ may output the signal sensed on sense line $Y_M$ to summation circuit 20$_M$. Buffer amplifier $B_N$ may output the signal sensed on sense line $Y_N$ to an inverter, which may then output an inverted signal to summation circuit 20$_M$. Accordingly, summation circuit 20$_M$ may sum the two signals to produce a differential signal to output to signal processing circuit 22$_M$. Signal processing circuit 22$_M$ may apply gains G1 and G2 to the signal by amplifiers A1$_M$ and A2$_M$, then integrate the signal using integrating circuit 24$_M$. After being integrated, the signal may be digitized by an analog-to-digital converter (ADC) and output over connection 18 to a sense line input of touch-sensor controller 12.

Similarly, buffer amplifier $B_N$ may output a second output of the signal sensed on sense line $Y_N$ to summation circuit 20$_N$. Buffer amplifier $B_M$ may output a second output of the signal sensed on sense line $Y_M$ to an inverter, which may then output an inverted signal to summation circuit 20$_N$. Accordingly, summation circuit 20$_N$ may sum the two signals to produce a differential signal to output to signal processing circuit 22$_N$. Signal processing circuit 22$_N$ may apply gains G1 and G2 to the signal by amplifiers $A1_N$ and $A2_N$, then may integrate the signal using integrating circuit $24_N$. After being integrated, the signal may be digitized by an (ADC) and output over connection 18 to a sense line input of touch-sensor controller 12.

Touch-sensor controller 12 may then use the differential measurements taken on the $Y_M$ and $Y_N$ sense lines to determine whether a touch object is proximate to the touch sensor 10. Based on the measured differential signals, touch-sensor controller 12 may determine, for example, that a touch object is located proximate to the capacitive node formed by the X drive line and the $Y_M$ sense line and/or the X drive line and the $Y_N$ sense line. The determination may be based on location of a touch object relative to the capacitive nodes formed by the X lines and the $Y_M$ and $Y_N$ lines. According to these principles, touch-sensor controller 12 may utilize differential measurements on a substantial portion and/or all of the sense lines in touch sensor 10. Each sense line may be paired to a corresponding sense line and operate in a similar manner to $Y_M$ and $Y_N$.

Figure 3:
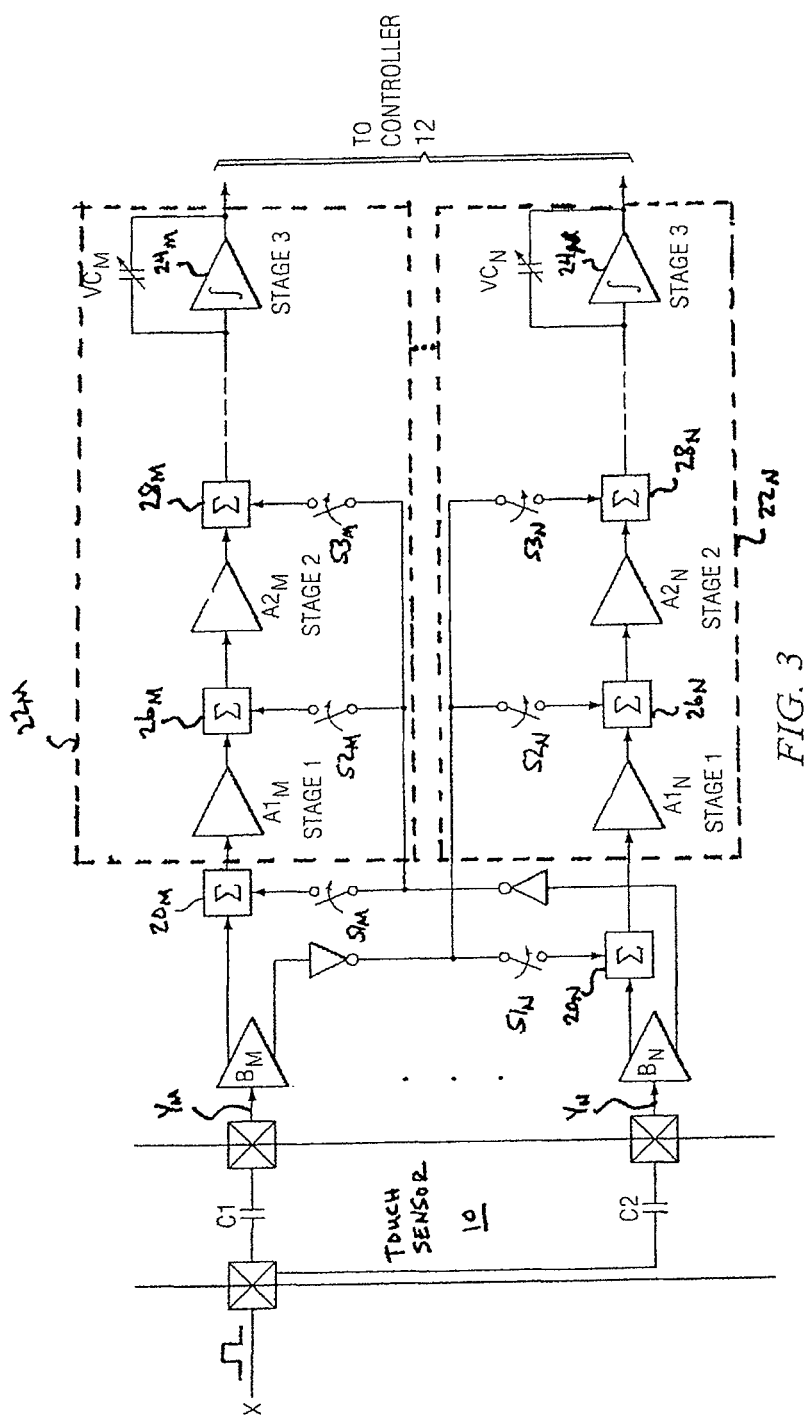
FIG. 3 illustrates another example circuit for differential sensing for capacitive touch sensors.

FIG. 3 illustrates another example touch sensor 10 that uses differential sensing. Touch sensor 10 as depicted in FIG. 3 includes substantially similar components as depicted in FIG. 2, but also includes switches $S1_M$ to $S3_M$ and switches $S1_N$ to $S3_N$. As shown, signal processing circuits 22 include additional summation circuits 26 and 28. Summation circuits 26 and 28 may operate in a substantially similar manner as described above with respect to summation circuits 20 of FIG. 2. Switches $S1_M$ to $S3_M$ and switches $S1_N$ to $S3_N$ may be activated and/or deactivated in an appropriate manner by touch-sensor controller 12 to control whether to take differential measurements on sense lines $Y_M$ and/or $Y_N$ or to take single-ended measurements on $Y_M$ and/or $Y_N$. In some embodiments, switches may be activated and/or deactivated as appropriate to control where in signal processing circuit 22 and/or touch sensor 10 the differential measurement is calculated.

Switches $S1_M$ to $S3_M$ and switches $S1_N$ to $S3_N$ may represent any appropriate form of mechanical and/or electrical switching device operable to conduct current in the on position and/or form an open circuit in the off position. For example, the switches may be any appropriate form of transistor device, including field effect transistors (FETS). In some embodiments, $S1_M$ to $S3_M$ and switches $S1_N$ to $S3_N$ may be implemented using metal-oxide-semiconductor FETS (MOSFETS), such as NMOS or PMOS transistors. The gates of switches $S1_M$ to $S3_M$ and $S1_N$ to $S3_N$ may be controlled via one or more control signals transmitted from touch-sensor controller 12.

$S1_M$ s illustrated as connected between the inverter connected to an output of buffer amplifier $B_N$ and an input to summation circuit $20_M$. When $S1_M$ is conducting and/or in the on position, a differential measurement may be taken at summation circuit $20_M$, in a similar manner as described above with respect to FIG. 2. When $S1_M$ is not conducting and/or in the off position, summation circuit $20_M$ may pass through the measurement received from buffer amplifier $B_M$.

$S1_N$ is illustrated as connected between the inverter connected to an output of buffer amplifier $B_M$ and an input to summation circuit $20_N$. When $S1_N$ is conducting and/or in the on position, a differential measurement may be calculated at summation circuit $20_N$, in a similar manner as described above with respect to FIG. 2. When $S1_N$ is not conducting and/or in the off position, summation circuit $20_N$ may pass through the measurement received from buffer amplifier $B_N$ to $A1_N$ of signal processing circuit $22_N$.

$S2_M$ is illustrated as connected between the inverter connected to an output of buffer amplifier $B_N$ and an input to summation circuit $26_M$. Another input of summation circuit $26_M$ may be connected to the output of amplifier $A1_M$. When $S2_M$ is conducting and/or in the on position, a differential measurement may be calculated at summation circuit $26_M$. Accordingly, summation circuit $26_M$ may produce a differential signal representing the sum of the scaled output of $A1_M$ and the inverted signal received from buffer amplifier $B_N$. When $S2_M$ is not conducting, summation circuit $26_M$ may pass through the scaled signal received from $A1_M$ to $A2_M$.

$S2_N$ is illustrated as connected between the inverter connected to an output of buffer amplifier $B_M$ and an input to summation circuit $26_N$. Another input of summation circuit $26_N$ may be connected to the output of amplifier $A1_N$. When $S2_N$ is conducting and/or in the on position, a differential measurement may be calculated at summation circuit $26_N$. Accordingly, summation circuit $26_N$ may produce a differential signal representing the sum of the scaled output of $A1_N$ and the inverted signal received from buffer amplifier $B_M$. When $S2_M$ is not conducting, summation circuit $26_N$ may pass through the scaled signal received from $A1_N$ to $A^2_N$.

$S3_M$ is illustrated as connected between the inverter connected to an output of buffer amplifier $B_N$ and an input to summation circuit $28_M$. Another input of summation circuit $28_M$ may be connected to the output of amplifier $A2_M$. When $S3_M$ is conducting and/or in the on position, a differential measurement may be calculated at summation circuit $28_M$. Accordingly, summation circuit $28_M$ may produce a differential signal representing the sum of the scaled output of $A2_M$ and the inverted signal received from buffer amplifier $B_N$. When $S3_M$ is not conducting, summation circuit $28_M$ may pass through the scaled signal received from $A2_M$ to integrating circuit $24_M$.

$S3_N$ is illustrated as connected between the inverter connected to an output of buffer amplifier $B_M$ and an input to summation circuit $28_N$. Another input of summation circuit $28_N$ may be connected to the output of amplifier $A2_N$. When $S3_N$ is conducting and/or in the on position, a differential measurement may be calculated at summation circuit $28_N$. Accordingly, summation circuit $28_N$ may produce a differential signal representing the sum of the scaled output of $A2_N$ and the inverted signal received from buffer amplifier $B_M$. When $S3_N$ is not conducting, summation circuit $28_N$ may pass through the scaled signal received from $A2_N$ to integrating circuit $24_N$.

In operation, touch-sensor controller 12 determines locations of touch objects proximate to touch sensor 10 using differential measurements on various sense lines of touch sensor 10 including sense lines $Y_M$ and $Y_N$. Touch-sensor controller 12 may selectively activate switches $S1_M$ to $S3_M$ and switches $S1_N$ to $S3_N$ to control where and/or whether differential measurements are made.

Touch-screen controller 12 may be capable of operating in single-ended mode and/or differential mode. Based on a determining to operate in single-ended mode, touch-screen controller may set switches $S1_M$ to $S3_M$ and/or switches $S1_N$ to $S3_N$ to the off position. Thus, the measurements sensed on the $Y_M$ and/or $Y_N$ sense lines may be processed by signal processing circuits 22 by taking single-ended measurements without taking differential measurements. In some embodiments, touch-screen controller 12 may be operable to select particular sense lines to operate in single-ended mode, while continuing to operate other sense lines in differential mode. For example, touch-screen controller 12 may determine to calculate a noise level, such as a display noise level, at touch sensor 10. Based on determining to calculate a noise level on a given sense line such as $Y_N$, touch-sensor controller 12 may deactivate switches $S1_N$, $S2_N$, and/or $S3_N$ to take a single ended measurement on sense line $Y_N$. Based on the single ended measurement, touch-sensor controller 12 may calculate a noise level on sense line $Y_N$. Touch-sensor 12 may additionally or alternatively be capable of calculating a noise level on several sense lines at once and/or in parallel.

Based on determining to operate in differential mode, touch-sensor controller 12 may determine to activate one or more of switches $S1_M$ to $S3_M$ and/or switches $S1_N$ to $S3_N$. To calculate a differential measurement at summation circuit $28_M$, touch-sensor controller 12 may activate $S3_M$ while deactivating $S1_M$ and $S2_M$. To calculate a differential measurement at summation circuit $26_M$, touch-sensor controller 12 may activate $S2_M$ while deactivating $S1_M$ and $S3_M$. To calculate a differential measurement at summation circuit $20_M$, touch-sensor controller 12 may activate $S1_M$ while deactivating $S2_M$ and $S3_M$. Similarly, to calculate a differential measurement at summation circuit $28_N$, touch-sensor controller 12 may activate $S3_N$ while deactivating $S1_N$ and $S2_N$. To calculate a differential measurement at summation circuit $26_N$, touch-sensor controller 12 may activate $S2_N$ while deactivating $S1_N$ and $S3_N$. To calculate a differential measurement at summation circuit $20_N$, touch-sensor controller 12 may activate $S1_N$ while deactivating $S2_N$ and $S3_N$. It should be noted, however, that while FIG. 3 illustrates various switches capable of taking differential measurements at various locations of touch sensor 10 and/or signal processing circuits 22, particular embodiments of touch sensor 10 may have all, some, or none of the aforementioned switches. For example, some embodiments of touch sensor 10 may only include switches $S1_M$ and $S1_N$ while omitting other switches. Alternatively, touch sensor 10 may include various switches at various locations as appropriate to take differential measurements of sense line capacitances.

Touch-sensor controller 12's determination of where to take differential measurements may depend on particular characteristics of touch sensor 10. For example, depending on the particular characteristics of touch sensor 10, capacitances C1 and C2 may be different. Thus, it may be desirable to pre-scale the signal sensed by a particular sense line using signal processing circuit 22 in order to compensate for differences in common-mode capacitances on various sense lines. In addition or alternatively, a signal may be scaled in order to increase the magnitude of the resulting differential signal. For example, it may be desirable to avoid a differential signal that is substantially close to zero. Thus, a signal may be scaled by particular amounts before subtracting the common-mode signals. The amplifiers of signal processing circuits 22 may be set in order to set the magnitude of the resulting differential signal. It should also be noted that the signal to be subtracted may, in some embodiments, be scaled before being subtracted from a sense line measurement. Thus, touch-sensor controller 12 may determine how much of the common-mode signals should be subtracted from a sense line measurement.

According to the teachings of the present disclosure, several technical advantages may be realized. One technical advantage may be providing a touch sensor 10 that is capable of detecting the location of a touch object using differential measurements. As another example, the ability to obtain differential measurements on various sense lines may result in a reduction in signal processing and/or conditioning requirements of signal processing circuits 22 as compared to that would otherwise be required using single-ended measurements. Differential measurements may also provide an improved signal to noise ratio. For example, differential measurements may cancel all or a substantial portion of display noise generated at or near touch sensor 10. Additionally or alternatively, touch sensor 10 may be optimized for power and/or area due to attenuated common-mode signal levels achieved using differential methodology. Embodiments of the present disclosure may include all, some, or none of the above benefits.

Figure 4:
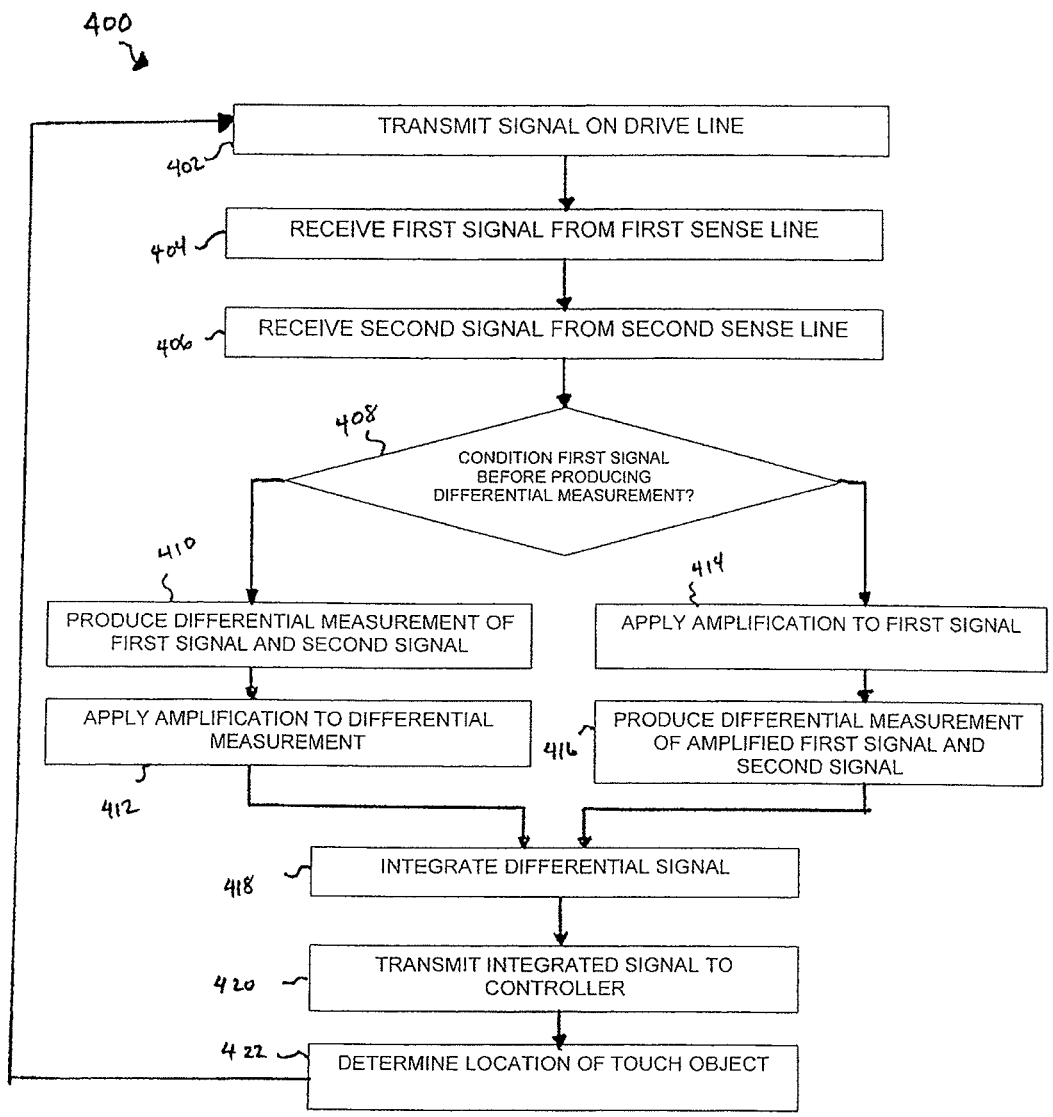
FIG. 4 illustrates an example method of operating a touch sensor using differential sensing.

FIG. 4 illustrates an example method 400 of operating a touch sensor 10 using differential sensing. At step 402, touch-sensor controller 12 may transmit a drive signal on drive line X of touch sensor 10. Touch-sensor controller 12 may successively drive pulses on each of the drive lines of touch sensor 10, such that each drive line may be pulsed in succession in a repeating cycle. After each pulse of a given drive line X, touch-sensor controller may detect the resulting signals on the sense lines of touch sensor 10. Based on the charges, touch-sensor controller 12 may detect the Y line proximate to a touch object. Thus, touch-sensor 12 may determine a particular X, Y coordinate of the touch object.

After pulsing a drive signal, at step 404, a first signal may be received on a first sense line of touch sensor 10 and, at step 406, a second signal may be received on a second sense line of touch sensor 10. At step 408, touch-sensor controller 12 may determine whether to condition the first signal and/or second signal before producing a differential signal. If touch-sensor controller 12 determines to condition one or both signals before producing a differential signal, touch-sensor 12 may activate appropriate switches of touch sensor 10 and/or signal processing circuit 22.

If signal conditioning is not required before taking a differential measurement, then at step 410, a differential signal may be produced on the first sense line and/or the second sense line. The differential signal may be produced at the locations within touch sensor 10 and/or signal processing circuit determined by touch-sensor controller 12 in the previous step. For example, a summing circuit 20 may subtract the second signal from the first signal and produce a first differential signal on the first sense line. In addition or alternatively, another summing circuit 20 may subtract the first signal from the second signal and produce a second differential signal on the second sense line. At step 412, the resulting differential measurement signal may then be input to signal processing circuit 22 for appropriate amplification, processing, and/or conditioning.

If signal conditioning is required before taking a differential measurement, the appropriate switches of signal processing circuits 22 may be activated to take a differential measurement at summing circuits 26 and/or 28. At step 414, any appropriate amplification may be applied to the first signal and/or second signal before taking a differential measurement. For example, a gain may be applied by amplifiers A1 and/or A2 to scale the first and/or second signals by the gain. As noted above, A1 may apply a proportional gain and/or A2 may apply a logarithmic gain. After one or more of the first and second signals are amplified, a differential measurement may be produced at step 416 by summing circuits 26 and/or 28. In some embodiments, the differential measurement may represent the difference between the amplified first signal and the second signal. The second signal may represent common-mode signals on the second sense line.

After step 412 and/or step 416 are completed, signal processing circuits 22 may integrate the differential measurement at integrators 24 at step 418. Integrators 24 may accumulate charge representing capacitances of the respective sense lines. At step 420, the output of integrators 24 may be transmitted to sense line inputs of touch-sensor controller 12. At step 422, touch-sensor controller 12 may determine a location of a touch object proximate to touch sensor 10 based on the differential measurements taken on the first sense line and the second sense line. Method 400 may then return to step 402 where another drive signal may be pulsed on another X drive line.

Although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, in particular embodiments. A computer-readable non-transitory storage medium or media may be volatile, non-volatile, or a combination of volatile and non-volatile, in particular embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, the components depicted in FIG. 2 may form a portion of and/or may be integrated into touch-sensor controller 12. Alternatively or in addition, such components may form a portion of and/or may be integrated into touch sensor 10. Moreover, the differential signal need not be produced by a summation circuit but may be calculated in any appropriate manner. Moreover, the differential signal may be produced at any appropriate location and/or in the course of processing the signals from the sense lines. For example, the signal may be subtracted at any of the internal nodes of the signal processing circuit 22. As another example, the differential signal may be calculated as the difference between two sense line inputs by a relevant processor of the touch-sensor controller 12 after signal processing activities have taken place. It should also be understood that the teachings of the present disclosure are applicable to a touch-sensor controller 12 that uses any manner of appropriate signal processing to process and/or condition signals received from sense lines of a touch sensor 10. In some embodiments signal processing circuits 22 may form all or a portion of a single signal processing circuit 22 capable of condition processing, and/or amplifying signals on all or a substantial portion of sense lines of touch sensors.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor operable to sense a differential measurement between two sense lines, comprising:
   a summing circuit connected to a touch sensor controller;
   a first buffer that includes a first input connected to a first sense line of the touch sensor and a first output connected to the summing circuit;
   a second buffer that includes a second input connected to a second sense line of the touch sensor and a second output connected to the first summing circuit; and
   wherein the summing circuit is operable to:
      receive a first capacitive measurement of the first sense line from the first buffer;
      receive a second capacitive measurement of the second sense line from the second buffer; and
      output a difference between the first capacitive measurement and the second capacitive measurement to the touch sensor controller.

2. The touch sensor of claim 1, further comprising:
   an inverter operable to invert one of the first output and the second output.

3. The touch sensor of claim 1, wherein the summing circuit comprises a first summing circuit and the touch sensor further comprises:
   a second summing circuit connected to the touch sensor controller, the second summing circuit operable to:
      receive the first capacitive measurement of the first sense line from the first buffer;
      receive the second capacitive measurement of the second sense line from the second buffer; and
      output a difference between the second capacitive measurement and the first capacitive measurement.

4. The touch sensor of claim 1, wherein the first sense line is separated from the second sense line by a plurality of sense lines.

5. The touch sensor of claim 1, wherein a distance between the first sense line and the second sense line is sufficient such that a touch object does not simultaneously touch both the first sense line and the second sense line.

6. The touch sensor of claim 1, wherein a signal conditioning circuit is connected between the summing circuit and the touch sensor controller, the signal conditioning circuit operable to:
   apply a gain to the difference between the first capacitive measurement and the second capacitive measurement to produce a scaled difference; and
   integrate the scaled difference and output the scaled difference to the touch screen controller.

7. The touch sensor of claim 1, further comprising:
a plurality of amplifiers operable to apply a gain to the difference between the first capacitive measurement and the second capacitive measurement;
a plurality of switches operable to selectively apply the difference to one or more of the plurality of amplifiers.

8. A method, comprising:
receiving a first signal from a first sense line of a touch sensor;
receiving a second signal from a second sense line of the touch sensor;
inverting the first signal;
summing the inverted first signal and the second signal to produce a differential signal; and
outputting the differential signal to a touch sensor controller.

9. The method of claim 8, further comprising
applying a scaling factor to the differential signal to produce a scaled differential signal;
wherein outputting the differential signal to the touch sensor controller comprises outputting the scaled differential signal to the touch sensor controller.

10. The method of claim 8, wherein the touch sensor controller is operable to determine a location of a touch object proximate to the touch sensor based on the differential signal.

11. The method of claim 8, wherein the first sense line is separated from the second sense line by a plurality of sense lines.

12. The method of claim 8, wherein the first sense line and the second sense line are configured such that summing the inverted first signal and the second signal cancels noise on the first sense line and the second sense line.

13. The method of claim 8, wherein the first sense line and the second sense line are configured such that summing the inverted first signal and the second signal cancels a common mode charge on the first sense line and the second sense line.

14. The method of claim 8, the method further comprising:
selectively summing the inverted first signal with an output of one of a plurality of amplifiers, the amplifiers operable to scale the second signal; wherein the selection is made based at least in part on a characteristic of the touch sensor.

15. The method of claim 8, the method further operable to:
in response to the touch sensor controller determining to measure a noise level on one of the first sense line and the second sense line, outputting the first signal and the second signal to the touch sensor controller.

16. A system comprising:
a touch sensor, operable to measure a differential signal that represents a difference between a first measurement of a first sense line and a second measurement of a second sense line, the touch sensor further comprising:
an inverting buffer operable to receive the first measurement from the first sense line and output an inverted first measurement; and
a summing circuit operable to receive the inverted first measurement and the second measurement and output the differential signal to the touch sensor controller; and
a touch sensor controller coupled to the touch sensor and operable to:
receive the differential signal from the touch sensor; and
determine a location of a touch object based on the differential signal.

17. The system of claim 16, wherein the difference between the first measurement and the second measurement cancels a common mode charge on the first sense line and the second sense line.

18. The system of claim 16, further comprising:
a signal conditioning circuit operable to apply a gain to the differential signal to produce a scaled differential signal; and
an analog-to-digital converter operable to digitize the scaled differential signal and output the digitized scaled differential signal to the touch sensor controller.

19. The system of claim 16, wherein the touch sensor comprises a drive line and the touch sensor controller is further operable to:
transmit a pulse on the drive line; and measure the differential signal in response to transmitting the pulse.

* * * * *